W. V. TURNER, DEC'D.
THE WESTINGHOUSE AIR BRAKE CO., ASSIGNEE.
REGENERATIVE BRAKE DEVICE.
APPLICATION FILED JUNE 8, 1920.
Reissued Nov. 15, 1921.
15,229.
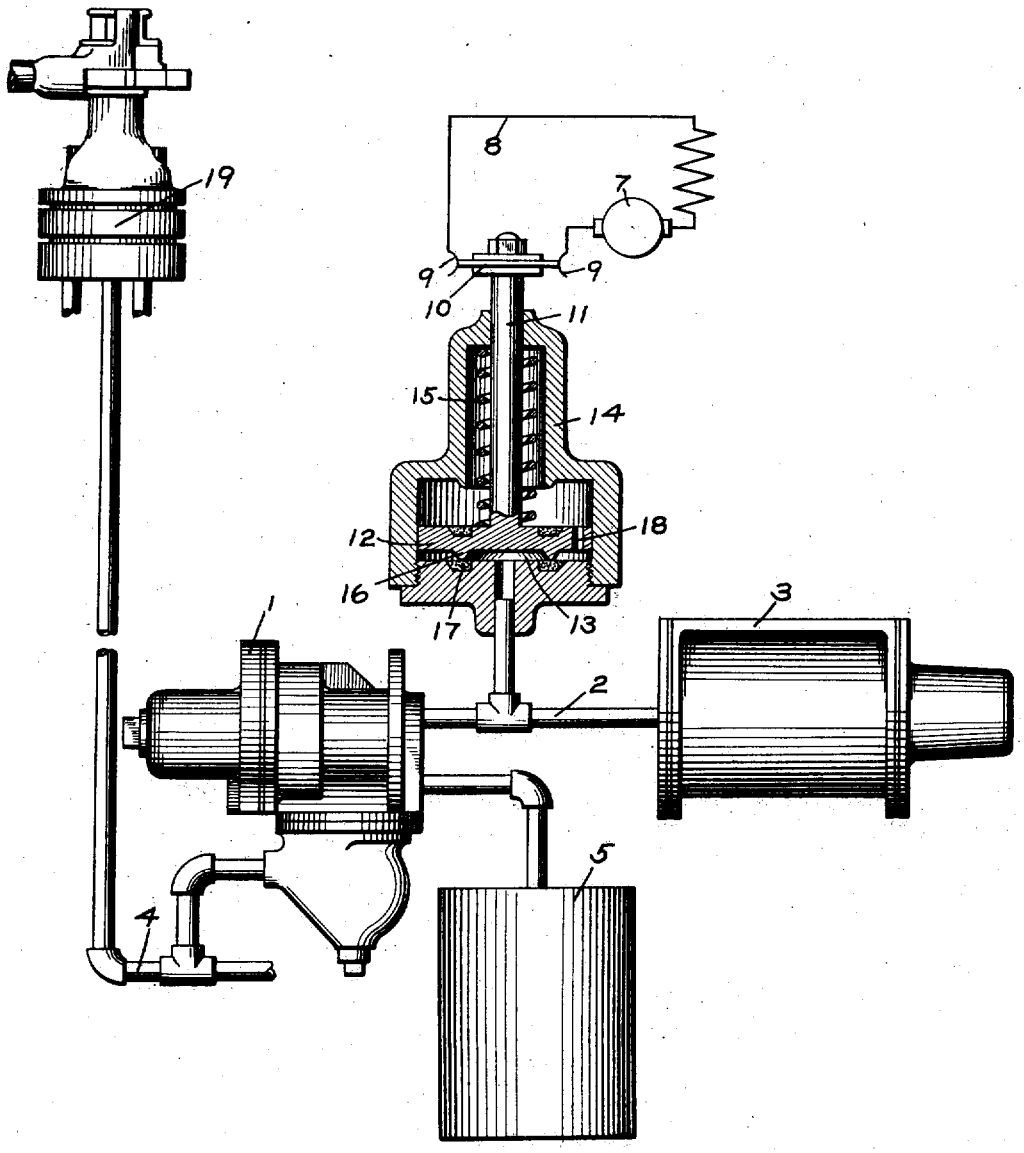
THE WESTINGHOUSE AIR BRAKE CO.
ASSIGNEE OF WALTER V. TURNER
(DEC'D) INVENTOR
BY Wm. H. Cady
ATTORNEY

UNITED STATES PATENT OFFICE.

WALTER V. TURNER, DECEASED, LATE OF WILKINSBURG, PENNSYLVANIA, BY THE WESTINGHOUSE AIR BRAKE CO., OF WILMERDING, PENNSYLVANIA, A CORPORATION OF PENNSYLVANIA, ASSIGNEE.

REGENERATIVE BRAKE DEVICE.

15,229. Specification of Reissued Letters Patent. Reissued Nov. 15, 1921.

Original No. 1,283,979, dated November 5, 1918, Serial No. 177,975, filed June 30, 1917. Application for reissue filed June 8, 1920. Serial No. 387,469.

*To all whom it may concern:*

Be it known that WALTER V. TURNER, late a citizen of the United States, residing at Wilkinsburg, in the county of Allegheny and State of Pennsylvania, now deceased, had invented new and useful Improvements in Regenerative Brake Devices, of which the following is a specification.

This invention relates more particularly to a brake equipment in which a regenerative brake is employed at one time and a fluid pressure brake at another time.

Where the brakes are applied by fluid under pressure, it is undesirable that the regenerative brake be set into action, since this is liable to produce an excessive braking power due to the combined braking action of the regenerative brake and the fluid pressure brake.

The principal object of the invention is to provide means operated upon applying the brakes by fluid under pressure for cutting the regenerative brake out of action.

In the accompanying drawing, the single figure is a diagrammatic view, partly in section, of a fluid pressure brake equipment and a regenerative brake, with the invention applied thereto.

As shown in the drawing, the fluid pressure brake equipment may comprise a triple valve device 1 for supplying and releasing fluid under pressure through pipe 2 to and from brake cylinder 3, a brake pipe 4 connected to the triple valve device 1, the usual auxiliary reservoir 5, and a brake valve device 19 of the well known construction for effecting a gradual reduction in brake pipe pressure for operating the triple valve device to effect a service application of the brakes and for effecting a more rapid reduction in brake pipe pressure to operate the triple valve device for effecting an emergency application of the brakes.

According to the present invention, a switch device controls a circuit of an electric or regenerative braking system which is energized when the regenerative brake is acting, such a circuit being represented in the drawing by the reference numeral 8, while the regenerative brake system is represented by a conventional symbolic device 7.

An actual regenerative brake system is not shown, since such a system is quite complicated and since the showing in the drawing of a switch device for controlling a circuit of a regenerative brake system which is energized when the regenerative brake is acting is all that is necessary to a full and complete understanding of the present invention. Reference is made to the various patents of the prior art disclosing regenerative braking systems such as Patent No. 1,245,398 of N. W. Storer, dated November 6, 1917, and Patent No. 1,245,523 of N. W. Storer, dated November 6, 1917.

The switch device may comprise fixed contacts 9 connected in the circuit 8 and a movable contact 10 adapted to open and close the regenerative circuit through the contacts 9.

The movable contact 10 is connected by a stem 11 to a piston 12 contained in piston chamber 13 of a switch casing 14.

A spring 15 acts on piston 12 and tends to hold the switch closed and piston chamber 13 is connected to brake cylinder pipe 2.

Piston 12 is provided with a seating ring 16 adapted to engage a seat 17, so as to normally expose only a restricted area of the piston to brake cylinder pressure.

In operation, when the fluid pressure brakes are applied, fluid under pressure is supplied by the triple valve device 1 through pipe 2 to the brake cylinder 3 and also flows to the seated area of piston 12, thereby causing the piston to lift from its seat, and the full area of said piston being then exposed to brake cylinder pressure, the prompt and sudden movement of the piston to open the switch is effected.

It will now be evident that when the fluid pressure brakes are applied, the regenerative braking circuit 8 is opened, so that the regenerative brake cannot be brought into action, but so long as the fluid pressure brakes remain released, the regenerative brake circuit is held closed, permitting the regenerative brake to act in the usual manner.

In order to permit the escape of fluid which may possibly leak past the seat 17 when the piston 12 is in its seated position and thus cause the operation of the piston, a port 18 may be provided through the piston 12.

Having now described the invention, what is claimed as new, and is desired to be secured by Letters Patent, is:—

1. The combination with a regenerative brake system, and a fluid pressure brake apparatus having a brake pipe, of means responsive to variations in brake pipe pressure for controlling the regenerative brake.

2. The combination with a regenerative brake system, and a fluid pressure brake apparatus having a brake pipe, of means responsive to a reduction in brake pipe pressure for rendering the regenerative brake inoperative.

3. The combination with a regenerative brake system, and a fluid pressure brake apparatus having a brake pipe and an engineer's brake valve, of means responsive to the movement of the engineer's valve to an application position for rendering the regenerative brake inoperative.

4. The combination with a regenerative brake, a brake pipe, and a valve device operated upon a reduction in brake pipe pressure for effecting an application of the brakes, of means controlled by brake pipe pressure for controlling the regenerative brake circuit.

5. The combination with means for applying air brakes to a railway train unit and means for applying electric braking to the same unit, the two braking means being each normally separately operable, of an engineer's valve for controlling the air brakes, and means responsive to the movement of the engineer's valve to the emergency position for rendering the electric braking inoperative.

6. The combination with means for applying air brakes to a railway train unit and means for applying electric braking to the same unit, the two braking means being each normally separately operable, of an engineer's valve for controlling the air brakes, and pneumatically operated means responsive to the movement of the engineer's valve to the emergency position for rendering the electric braking inoperative.

7. The combination with an electric braking system and an air brake system, the latter including a valve mechanism, said valve mechanism being provided with a member movable in response to an emergency application of the air brakes, and means responsive to the movement of said member for making the electric braking system inoperative.

8. The combination with means for applying air brakes to a railway train unit and means for applying electric braking to the same unit, the two braking means being each normally separately operable, of means responsive to an emergency application of the air brakes for rendering the electric braking inoperative.

9. The combination with means for applying air brakes to a railway train unit and means for applying electric braking to the same unit, the two braking means being each normally separately operable, of means under the control of the train operator for making an emergency application of the air brakes and simultaneously rendering the electric braking inoperative.

10. The combination with a fluid pressure brake equipment and a regenerative brake apparatus, of means operated upon applying the brakes by fluid under pressure for cutting the regenerative brake apparatus out of action.

11. The combination with a fluid pressure brake and a regenerative brake having a local closed circuit, of means operated upon applying the fluid pressure brakes for opening the circuit of the regenerative brake.

12. The combination with a regenerative brake apparatus, of a switch controlling the regenerative brake circuit, a brake cylinder, and a piston operated by fluid supplied to the brake cylinder for controlling said switch.

THE WESTINGHOUSE AIR BRAKE CO.,
*Assignee.*

By HUBERT C. TENER,
*Secretary.*